(12) United States Patent
Eberl et al.

(10) Patent No.: US 8,138,753 B2
(45) Date of Patent: Mar. 20, 2012

(54) MEASURING ARRANGEMENT FOR DETECTING A 1/ROTARY MOMENTUM OF AN ENGINE ROTOR, AND ASSOCIATED METHOD

(75) Inventors: Johann Eberl, München (DE); Michael Zielinski, Unterschleissheim (DE); Gerhard Ziller, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 263 days.

(21) Appl. No.: 12/441,216

(22) PCT Filed: Sep. 1, 2007

(86) PCT No.: PCT/DE2007/001571
§ 371 (c)(1),
(2), (4) Date: Apr. 7, 2009

(87) PCT Pub. No.: WO2008/031394
PCT Pub. Date: Mar. 20, 2008

(65) Prior Publication Data
US 2009/0256556 A1    Oct. 15, 2009

(30) Foreign Application Priority Data
Sep. 14, 2006    (DE) .......................... 10 2006 043 283

(51) Int. Cl.
*G01B 7/30*    (2006.01)

(52) U.S. Cl. .................................. 324/207.25; 324/699

(58) Field of Classification Search .................. 324/166, 324/207.25, 644, 635, 162, 207.23, 167
See application file for complete search history.

(56) References Cited

U.S. PATENT DOCUMENTS

| | | | | |
|---|---|---|---|---|
| 3,058,339 | A * | 10/1962 | Shapiro | ............................ 73/660 |
| 3,190,125 | A | 6/1965 | Holz | |
| 3,628,136 | A | 12/1971 | Jonas | |
| 6,050,242 | A * | 4/2000 | Wilkinson | ................ 123/406.58 |
| 6,404,188 | B1 * | 6/2002 | Ricks | ....................... 324/207.22 |
| 6,969,988 | B2 * | 11/2005 | Kakuta et al. | .............. 324/207.2 |

FOREIGN PATENT DOCUMENTS

| | | |
|---|---|---|
| DE | 43 28 686 A1 | 3/1995 |
| EP | 0 246 576 | 11/1987 |
| GB | 2 416 848 | 2/2006 |
| JP | 57 200832 | 12/1982 |

* cited by examiner

*Primary Examiner* — Huy Q Phan
*Assistant Examiner* — Alesa Allgood
(74) *Attorney, Agent, or Firm* — Greer, Burns & Crain, Ltd.

(57) ABSTRACT

A measurement system for detecting a rotary movement of a rotor that is situated in particular in rotatable fashion in a compressor housing of a jet engine, includes the rotor having vane elements that are preferably situated equidistant from one another on its periphery, and in addition at least one sensor being provided, and at least one material measure being fashioned on the rotor that can be periodically detected by the sensor due to the rotational movement, the material measure is formed by at least one modified vane element that is truncated in the area of the vane tip, the sensor outputting an identical measurement signal in each case when the vane elements travel past, and outputting a modified measurement signal when the modified vane element travels past.

11 Claims, 3 Drawing Sheets

MEASURING ARRANGEMENT FOR DETECTING A 1/ROTARY MOMENTUM OF AN ENGINE ROTOR, AND ASSOCIATED METHOD

The present invention relates to a measurement arrangement for detecting a rotational movement of a rotor, in particular a rotor that is received so as to be capable of rotation in a compressor housing of a jet engine, the rotor having vane elements that are situated in equidistant fashion on the periphery of the rotor, a sensor additionally being provided that outputs measurement signals for further electronic processing, and at least one material measure being fashioned on the rotor that is capable of being detected periodically by the sensor due to the rotational movement.

During the testing of components of jet engines, such as the compressor or the turbine in a rig construction, the drive shaft is usually easily accessible. In these cases, the 1/rotary momentum can easily be produced by an optical reflection sensor that reacts to a colored marking on the drive shaft, or by a distance sensor that recognizes local recesses or raised parts on the shaft.

In contrast, when performing measurements on full engines the problem arises that access to the shaft is considerably more difficult, and that sensors can be attached to the shaft only at great expense. In particular, in high-pressure compressors the problem occurs that a significant constructive outlay is required in order to attach mounts for the sensors and to lead out the cables for the transmission of the measurement signals. If a rotational speed sensor is present, a tooth of a toothed disk situated on the rotor shaft can be truncated, and a 1/rotary momentum can be derived therefrom. However, as a rule this cannot be done in the short term, or at least not at a reasonable expense; moreover, it requires intervention in a finished, functioning component of the jet engine.

FIG. 4 shows a measurement design according to the prior art that is suitable for measuring the rotation of a rotor of a jet engine. A toothed ring 31 is situated in rotationally fixed fashion on a rotor shaft 30, said ring having a multiplicity of teeth with short slits 33 between them. This toothed ring 31, provided with teeth, is generally designated a phonic wheel. As examples, two magnetic sensors 32a and b are shown that are situated close to the short slits 33, or at a long slit 34, of toothed ring 31. If rotor shaft 30 is moving around its own axis with a rotational movement, slits 33, 34 move under sensors 32a and b. If these sensors are realized for example as magnetic sensors, sensor 32a outputs a periodically recurring, uniform measurement signal at slits 33 and 34. At long slit 34, only sensor 32b outputs a measurement signal. This measurement signal can be extracted by a measurement value detection, and a 1/rotary momentum can be derived therefrom.

In this design according to the prior art, the problem arises that it is very difficult to gain access to a toothed ring 31 situated on rotor shaft 30, as well as to sensors 32a, b, which are situated close to toothed ring 31. In general, the components of jet engines are situated very close to one another, so that in the assembled state of the jet engine the rotor shaft itself is completely inaccessible from the outside, or is accessible only with great difficulty. Mounts for attaching the sensors are also difficult to realize due in particular to the spatial problem.

The object of the present invention is therefore to create a measuring arrangement for detecting a 1/rotary momentum of a jet engine rotor that is characterized by a simple arrangement of the sensors, and that offers easy accessibility.

According to the present invention, it is provided that the material measure is formed by at least one modified vane element that has an area that is truncated at the end, the sensor outputting an approximately identical measurement signal each time the vane elements travel past, and outputting a modified measurement signal when the modified vane element travels past.

In this way there results the advantage essential to the present invention, namely that the sensor for detecting the measurement signals no longer has to be situated on the rotor shaft of the jet engine. Rather, the possibility is created of situating the sensor for detecting the measurement signals in the external area of the jet engine, situated at least outside the path of rotation of the vane elements. It is particularly advantageous to situate the sensor in the compressor housing of the jet engine, so that the sensor is brought close to the outer path of rotation of the vane elements, and the end areas of the vane elements travel past the sensor. When the non-modified vane elements travel past the sensor, measurement signals are outputted that closely resemble each other. However, when the modified vane element travels past the sensor, the sensor outputs a modified measurement signal that differs from the other measurement signals. The modification of the vane element is formed by a truncated area situated in the end region of the vane element, i.e. in the region having the largest rotation radius of the vane element. The truncation of the vane element is carried out in such a way that this element is clearly distinguishable from the other vane elements in terms of length. The amount by which the vane element is truncated depends on the range of variation of the individual vane lengths, because it has to be significantly greater than this. A typical value for the truncating can be in a range from 0.1-2 mm, preferably 0.25-1 mm, particularly preferably 0.5 mm.

According to an advantageous development of the present invention, it is provided that the sensor is fashioned as a distance-sensitive sensor. This sensor can operate according to a capacitive, magnetic, and/or optical measurement signal acquisition principle. Capacitive sensors are for example also used to measure the radial play between the rotor and the housing; in general, all distance sensors may be used that operate according to other physical principles and that are capable of detecting the corresponding geometrical modification of the vane element. For example, it is also conceivable to use an optical, in particular a laser-based, system that can also detect the geometric modification of the modified vane element in contactless fashion.

According to another exemplary embodiment of the present invention, it is provided that the truncated area of the modified vane element extends over the entire chord length of the vane element, or is fashioned only in a partial area of the chord length. In this context, the chord length describes the length of the vane profile measured from the front edge of the profile to the rear edge of the profile. In order to minimize the imbalance resulting from the loss of mass due to the truncated area of the modified vane element, it can therefore be provided that the modified vane element be truncated not over the entire profile length, i.e. over the entire chord length, but that a geometrical modification be carried out only in a partial area. Here for example a truncating of the blade tip in the area of the rear edge of the profile is possible. The sensor is situated over this partial area, a small truncated area of the modified vane element being sufficient to create adequate distinguishability of the modified measurement signal from the non-modified measurement signal.

If the truncated area is fashioned in a partial area of the chord length of the modified vane element, it is provided that the transition from the truncated area to the non-truncated area of the end of the vane has rounding radii. This creates a uniform transition from the untruncated to the truncated area.

Advantageously, the modified measurement signal has a lower amplitude than does the non-modified measurement signal. If a capacitive sensor is used, a measurement signal is outputted that outputs a measurement signal having a higher amplitude as the sensor comes into closer proximity to the metallic component embodied by the vane element. The amplitude level is here expressed as the magnitude of the outputted measurement voltage. When a non-modified vane element travels past the sensor, it moves closer to the sensor due to the fact that it is not truncated, whereas a modified vane element having a truncated area will have a greater distance from the measuring sensor. As a result, the voltage of the measurement signal will be lower than is the case when a non-modified vane element, having a non-truncated area, travels past. Through further processing of the measurement signal, the smaller measurement signal can then be isolated by filtering from the larger measurement signals that are similar to one another, in order to generate a 1/rotary momentum therefrom.

In addition, a method for further processing of measurement signals is provided, the measurement signals being outputted by the measurement arrangement, and the measurement signals having peak values that are held, using sampling or hold elements, until the peak value of the following measurement signal in order to form a peak value curve. If a normal measurement signal is acquired, the peak value is the maximum of the measurement voltage. This maximum is held in a memory and is stored without modification until the next peak value of the following measurement signal is acquired and this peak value differs from the preceding peak value. This design, also known as "sample and hold," enables the formation of a peak value curve that outputs only the change in the respective peak values.

Here, the difference between the peak value, forming the signal maximum of the measurement signal, and the signal minimum, which is measured by the sensor between the vane elements, is advantageously acquired, so that the measurement arrangement is not sensitive to low-frequency signal disturbances. This advantage can be exploited if no absolute values, but only a difference between maximum and minimum, are measured, so that when low-frequency signal disturbances occur the overall voltage level of the measurement signal can be modified, but the difference between the maximum and the minimum of the signal is not modified, so that the outputted peak value curve does not change as a result of low-frequency signal disturbances.

According to another advantageous exemplary embodiment of the present invention, it is provided that a high-pass filtering of the measurement signals is carried out in order to create an offset suppression and to form the signal curve. In addition, it is provided that a low-pass filtering of the measurement signals is carried out in order to create a smoothing of the signals, and likewise to form the signal curve therefrom. In order to isolate a 1/rotary momentum from the signal curve, it is provided that an edge triggering of the signal curve is formed in response to a trigger threshold. After the edge triggering, a further subsequent pulse shaping then takes place, so that a 1/rotary momentum can be displayed in isolated form. If the signal curve falls below the trigger threshold, the pulse shaping outputs the beginning of the 1/rotary momentum, the pulse width of the 1/rotary momentum being unimportant for the further signal processing. Alternatively, it can be provided to detect the exceeding of the trigger threshold, and to carry out the pulse shaping thereupon, because both the falling below and the exceeding of the trigger threshold each occur only once per revolution of the rotor.

Additional features that improve the present invention are indicated in the subclaims, or are presented in more detail below together with the description of a preferred exemplary embodiment of the present invention on the basis of the Figures.

The Figures are merely exemplary schematic representations of the present invention.

Figure 1:
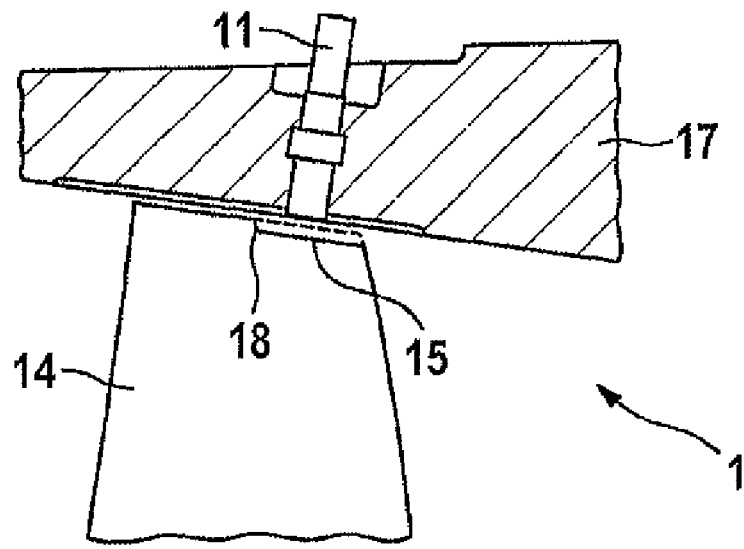
FIG. 1 shows a schematic representation of the arrangement of a sensor, as well as of a modified vane element, in a side view according to the present invention.

FIG. 1 shows a measurement arrangement 1 for generating a 1/rotary momentum, a sensor 11 according to the present invention being situated in the outer area of the jet engine. In particular, sensor 11 is situated in compressor housing 17, and is thus easily accessible from outside the jet engine. Sensor 11 is fashioned as a capacitive distance sensor, a modified vane element 14 being shown underneath sensor 11 that has a truncated area 15 in its radially outward end region. This truncated area 15 extends over a partial area of the chord length of modified vane element 14, the original contour of vane element 14 being indicated by a dashed line. When modified vane element 14 travels past, sensor 11 detects a larger distance to the edge of the body of modified vane element 14, the larger distance being formed by truncated area 15. Here, sensor 11 can be screwed in, clamped, glued, or attached in some other way in compressor housing 17. The sensing area of sensor 11 is oriented in the direction of vane element 14, such that the gap between sensor 11 and the vane element can be a few millimeters or even fractions of a millimeter.

Figure 2:
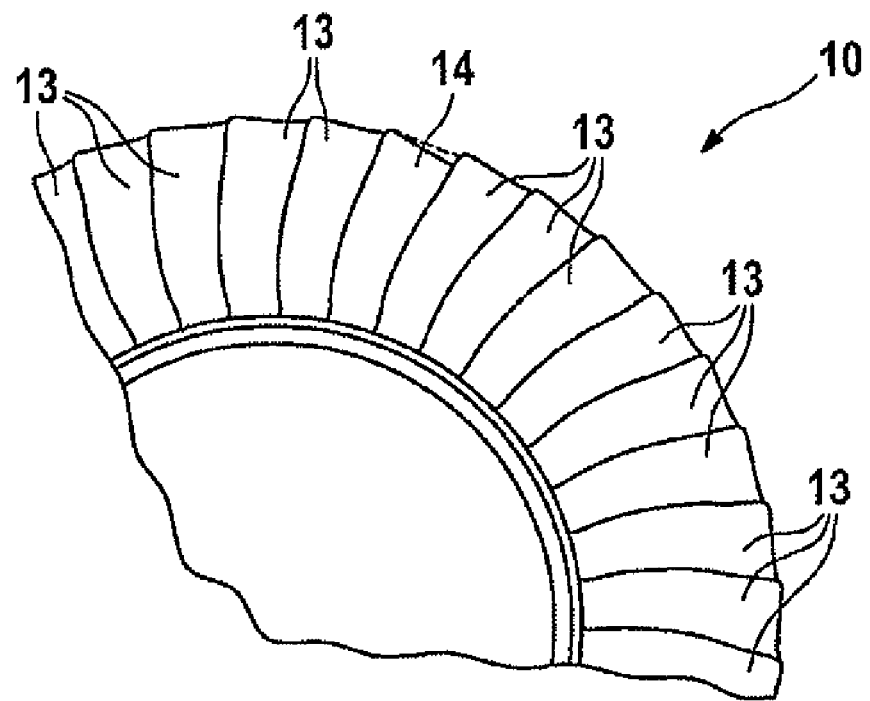
FIG. 2 shows a top view of a rotor having a plurality of vane elements, one vane element being shown as a modified vane element.

FIG. 2 shows a top view of a rotor 10 that has a multiplicity of vane elements 13, one vane element being fashioned as a modified vane element 14. As the Figure shows, modified vane element 14 is shorter than the other vane elements 13, the truncating of vane element 14 being only slight.

Figure 3A:
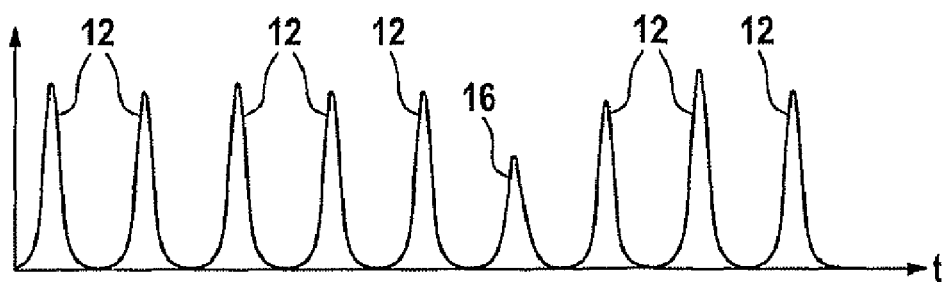
FIG. 3a shows the curve of measurement signals outputted by the measurement arrangement, one measurement signal being shown as a modified measurement signal.

FIG. 3a shows a diagram in which the measurement signal is plotted on the ordinate as a value without being assigned a physical quantity. In the following, it may be assumed that the measurement signal is a voltage U. On the abscissa, the time is plotted over which the measurement signals are recorded. At first five normal measurement signals 12 follow one another, each having essentially the same peak value. The sixth measurement signal is a modified measurement signal 16 having a significantly lower peak value. Subsequently, three additional normal measurement signals 12 are shown as examples. The lower peak value of modified measurement signal 16 results from the larger geometric distance of the sensor from the modified vane element, and differs significantly from the other measurement signals 12. The other measurement signals 12 are not completely identical to one another, but are also subject to a certain degree of variation, the range of this variation resulting from the various vane lengths and thicknesses (manufacturing tolerances). However, the difference of the peak value of modified measurement signal 16 is essentially larger than the range of variation of the other measurement signals 12.

Figure 3B:
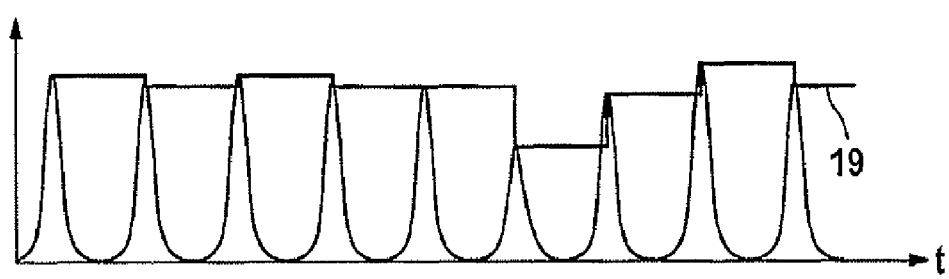
FIG. 3b shows the curve of the measurement signals according to FIG. 3a, a peak value curve also being shown.

FIG. 3*b* shows measurement signals 12 and 16 from FIG. 3*a*, and a peak value curve 19 is also shown. This peak value curve is formed using sample and/or hold elements, by first detecting a first peak value of a measurement signal and then holding it until a further measurement signal is detected. This results in a continuous signal in the form of a peak value curve 19, the magnitude of signal 19 always undergoing a change only if a peak value of a measurement signal 12 differs.

Peak value curve 19 undergoes a significant change when a modified measurement signal 16 follows a measurement signal 12. This change is not reset until a normal measurement signal 12 again follows after modified measurement signal 16.

Figure 3C:
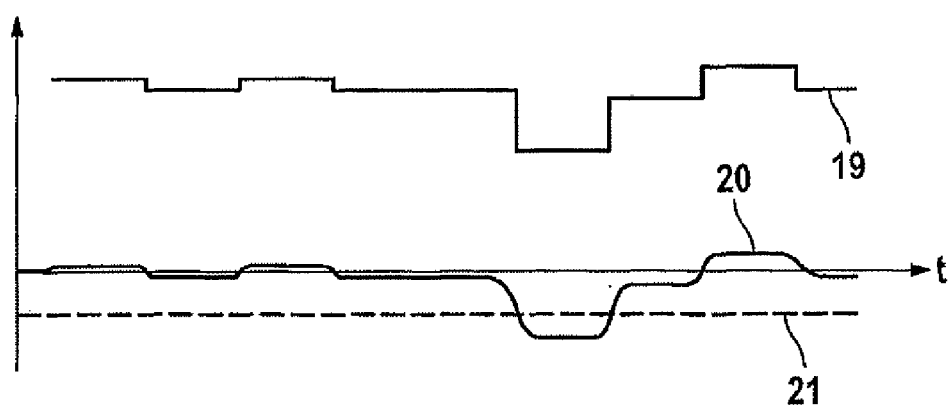
FIG. 3c shows a peak value curve according to FIG. 3b, a signal curve also being shown that results from high-pass filtering and light low-pass filtering, and triggered by a trigger threshold.

FIG. 3*c* shows, in addition to peak value curve 19, a signal curve 20. A trigger threshold 21 is also shown. Signal curve 20 is obtained by a high-pass filtering of signal curve 19 in order to create an offset suppression. There also takes place a low-pass filtering of the signal in order to achieve a smoothing of the signal curve. If signal curve 20 corresponds to measurement signals 12, trigger threshold 21 has not been undershot. However, if there follows a modified measurement signal 16, trigger threshold 21 is undershot, and a edge triggering of signal curve 20 in response to trigger threshold 21 is then first formed.

Figure 3D:
FIG. 3d shows a 1/rotary momentum representing a rotation of the rotor of the jet engine.
Figure 4:
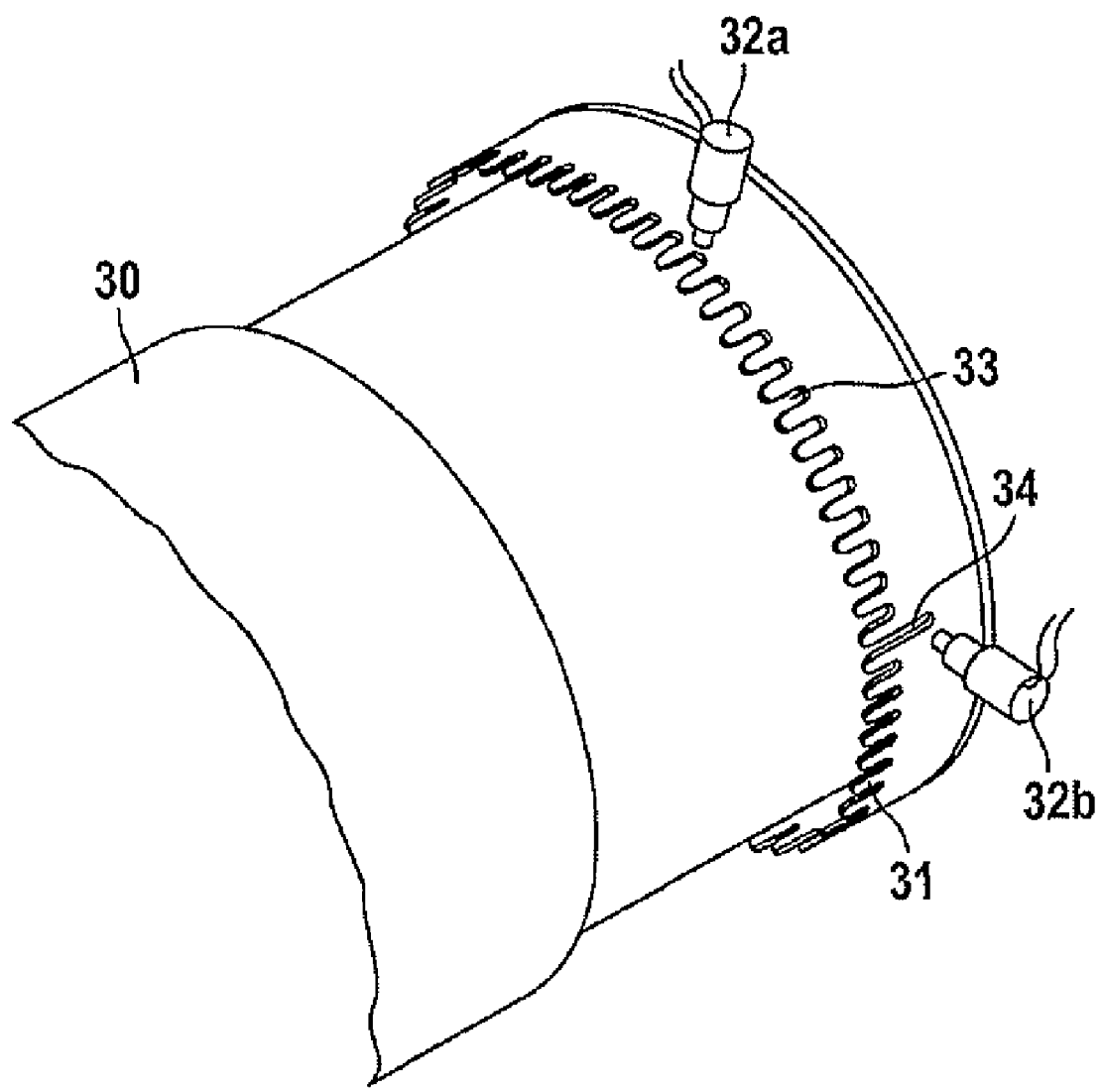
FIG. 4 shows a measurement arrangement according to the prior art for producing a 1/rotary momentum directly on the rotor shaft.

FIG. 3*d* shows a 1/rotary momentum that can be isolated by the edge triggering of signal curve 20 from FIG. 3*c*, in order to represent a rotation of the rotor by 1/rotary momentum 22. Here, the 1/rotary momentum 22 is formed precisely at the moment at which signal curve 20 undershoots trigger threshold 21. The width, i.e. the duration of 1/rotary momentum 22, does not play any significant role in the representation of the measurement value; in addition, a triggering of the measurement signal can also take place when signal curve 20 again exceeds the trigger threshold.

The realization of the present invention is not limited to the above-indicated preferred exemplary embodiment. Rather, a number of variants are conceivable that make use of the presented solution even in fundamentally differently realized embodiments.

The invention claimed is:

1. A measurement system for detecting a rotary movement of a rotor that is situated in rotatable fashion in a compressor housing of a jet engine, comprising: the rotor having a plurality of overlapping vane elements at least one distance sensor is provided and is configured for measuring a distance between each of said vane elements and said distance sensor and generating a corresponding distance measurement signal, and at least one material measure being fashioned on the rotor that can be periodically detected by the distance sensor due to the rotational movement of the rotor, the at least one material measure is formed by at least one modified vane element that is truncated in the area of the vane tip, the distance sensor outputting an identical distance measurement signal in each case when the vane elements travel past, and outputting a modified distance measurement signal when the modified vane element travels past the distance sensor.

2. The measurement arrangement as recited in claim 1, wherein the sensor is fashioned as one of a capacitive, magnetic, and optical sensor.

3. The measurement arrangement as recited in claim 1, wherein the sensor is situated in the compressor housing of the jet engine in order to be close to the outer rotational path of the vane elements.

4. The measurement arrangement as recited in claim 1, wherein the truncated area of the modified vane element extends over the entire chord length of the modified vane element, or is fashioned only in a partial area of the chord length.

5. The measurement arrangement as recited in claim 4, wherein the transition from the truncated area to the non-truncated area of the end of the vane has rounding radii.

6. The measurement arrangement as recited in claim 1, characterized in that the modified measurement signal has a lower amplitude than the non-modified measurement signals.

7. A method for the further processing of measurement signals that are outputted by a measurement arrangement as recited in claim 1, the measurement signals having peak values that are held, using sample and/or hold elements, until the peak value of the subsequent measurement signal, in order to form a peak value curve.

8. The method as recited in claim 7, wherein the difference is detected between the peak value that forms the signal maximum of the measurement signal and the signal minimum measured by the sensor between the vane elements, so that the measurement arrangement is not sensitive to low-frequency signal disturbances.

9. The method as recited in claim 7, characterized in that a high-pass filtering of the measurement signals is carried out in order to create an offset suppression and to form a signal curve.

10. The method as recited in claim 7, wherein a low-pass filtering of the measurement signals is carried out in order to create a smoothing of the signal curve.

11. The method as recited in claim 7, wherein an edge triggering of the signal curve is formed at a trigger threshold, and a subsequent pulse shaping is carried out in order to form a 1/rotary momentum.

* * * * *